No. 739,394. PATENTED SEPT. 22, 1903.
J. M. CROW.
WINDMILL.
APPLICATION FILED MAR. 17, 1903.
NO MODEL. 2 SHEETS—SHEET 2.

Witnesses
Charles Morgan.
Harry Ellis Chandlee

Inventor
J. M. CROW.
by Chandlee & Chandlee
Attorneys

No. 739,394. Patented September 22, 1903.

UNITED STATES PATENT OFFICE.

JOHN MARTEN CROW, OF MUSTANG, OKLAHOMA TERRITORY.

WINDMILL.

SPECIFICATION forming part of Letters Patent No. 739,394, dated September 22, 1903.

Application filed March 17, 1903. Serial No. 148,229. (No model.)

*To all whom it may concern:*

Be it known that I, JOHN MARTEN CROW, a citizen of the United States, residing at Mustang, in the county of Canadian, Territory of Oklahoma, have invented certain new and useful Improvements in Windmills; and I do hereby declare the following to be a full, clear, and exact description of the invention, such as will enable others skilled in the art to which it appertains to make and use the same.

This invention relates to windmills; and it has for its object to provide a device of this nature which will be so arranged that through the adjustment of certain of its parts the wheel may be caused to rotate in either direction or to remain stationary.

Further objects and advantages will be understood from the following description.

Figure 1:
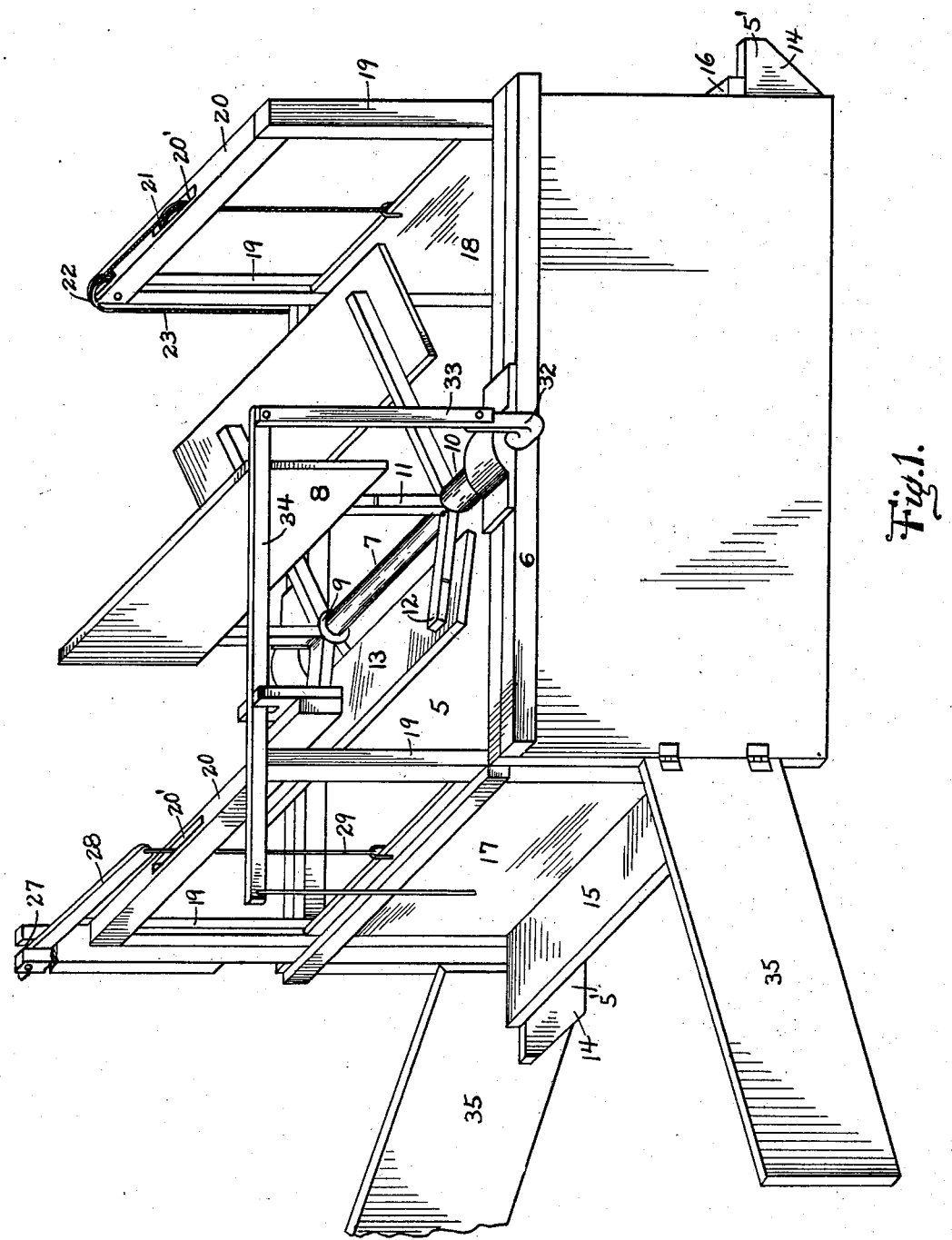
Figure 2:
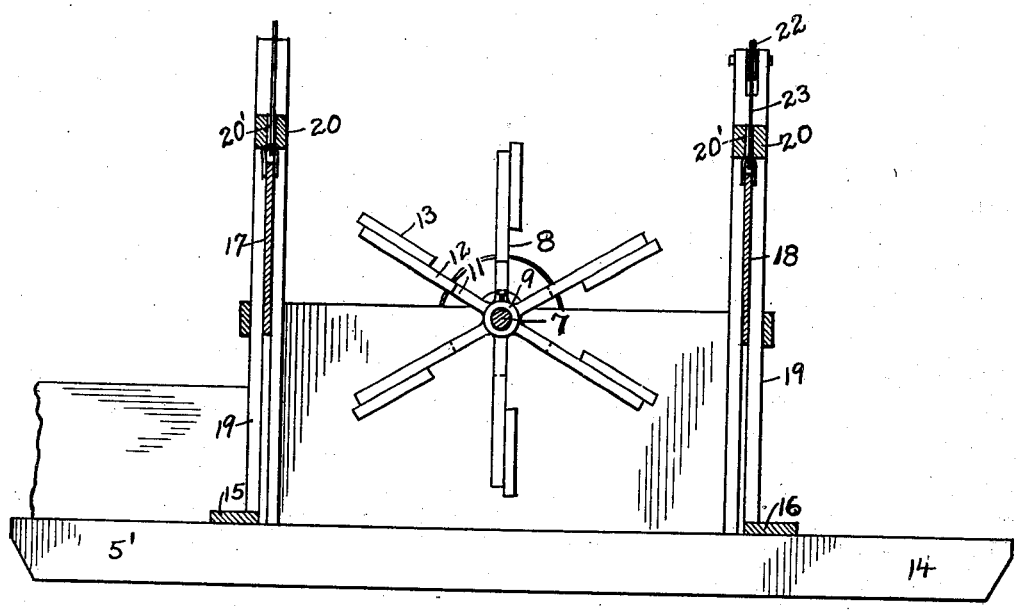
Figure 3:
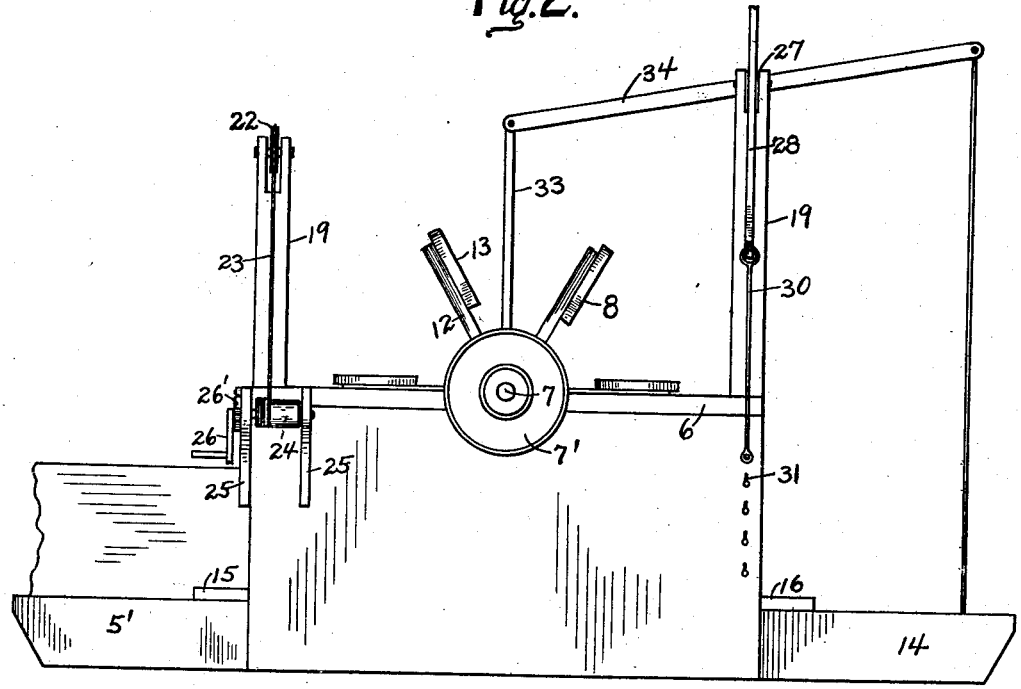

In the drawings forming a portion of this specification and in which like numbers indicate similar parts in the several views, Figure 1 is a perspective view of the wheel and its casing, showing the doors lowered. Fig. 2 is a longitudinal section showing the doors raised. Fig. 3 is a side elevation of the windmill.

Referring now to the drawings, the present invention comprises an open-ended box or shaft 5, having bars 6 in the upper portions of the sides thereof, in which are journaled the ends of a shaft 7 of a wind-wheel 8. This wind-wheel comprises a pair of hollow cylindrical members 9 and 10, disposed upon the shaft 7 and secured by means of set-screws. Each of these members is provided with a series of radial arms 11, extending at right angles to the body of the member, and secured to each of these arms by any desired means is an extension 12. To the outer ends of the extensions of the corresponding arms 11 of the two members 9 and 10 is secured a blade 13, which blades act as the wings of the wheel.

The members 9 and 10 and the radial arms 11 may be formed by sawing longitudinal slots in the ends of a pair of sections of pipe and bending the resultant spaced portions outwardly at right angles to the unsawed portions.

Secured to the inner faces of the sides of the box 5 at the bottom edges thereof are a pair of braces 14, which extend beyond the ends of the sides and have secured to the upper edges thereof a pair of sills 15 and 16, which support the lower edges of doors 17 and 18, which will be hereinafter described.

Secured to the sills 15 and 16 and to the inner faces of the walls of the box 5, one in each corner thereof, are four uprights 19, having their inner faces curved to receive the edges of the doors 17 and 18 mentioned above, which are adapted to slide vertically therein. Each pair of these uprights 19, by which is meant the two at the corresponding ends of the sides of box 5, are connected at their tops by a brace 20, which has an elongated perforation 20' midway of its length. The perforation 20' in one of these braces 20 has journaled therein a pulley 21, which is in alinement with a second pulley 22, journaled in the top of one of the uprights 19. These pulleys are adapted to receive a cable 23, which is secured at one of its ends to the door 18 and at its other with a winding-drum 24, journaled in brackets 25 upon the side of the box 5. For revolving this drum a crank 26 is provided, and to hold the drum from unwinding through the strain put upon the cable 23 by the door 18 a ratchet mechanism 26' is provided.

At the opposite end of the device from that just described one of the uprights 19 has pivoted in a bifurcation 27 in its top a lever 28, having a rod 29 pivotally secured to one of its ends, which rod is disposed within the central perforation 20' of the remaining brace 20, the other end of said rod being connected with the upper edge of the door 17. Connected to the outer end of the lever 28 is a rod 30, which is adapted for engagement with pegs 31, disposed upon the side of the box 5.

One end of the shaft 7 is bent to form a crank 32, which is connected by means of a pitman 33 with a pump-lever 34. On the opposite end of the shaft 7 from that carrying the pitman 33 is a belt-wheel 7', which may be used when it is desired to operate a piece of machinery by means of the present form of wind-motor. It will be understood that the entire device may be secured to the ordinary form of turn-table used in windmills, and to keep the front of the device always directed toward the wind a pair of wings or vanes 35 are attached to the sides of the box 5 at one end thereof and extend outwardly at an obtuse angle thereto.

Upon the bottom of the casing 5 are secured runners 5', upon which the device may be drawn from place to place. Should it be desired to set the wheel in motion, the doors 17 and 18 are disposed at the limit of their motion—say the downward limit thereof—which will expose the upper half of the wheel to the action of the wind, which will be revolved accordingly. Should it now be desired to change the direction of rotation of the wheel, the doors are moved to the opposite limit of their motion—in this case the upper limit—which exposes the lower half of the wheel to the action of the wind and causes the wheel to revolve in the opposite direction.

It will of course be understood that if the doors are held midway of their paths of movement the effect of the wind upon the upper and lower blades of the wheel will be equalized and movement of the wheel will be stopped. The means for adjusting the door, which embodies the cable and pulley mechanism, is designed to be disposed at the front or windward end of the box, for the reason that in order to exactly equalize the effect of the wind upon the wheel this door should be capable of finer adjustment than the remaining door, which, as above described, is adjusted by means of the rope and cleat.

It will of course be understood that, if desired, the general arrangement of the present device may be applied to a water-wheel and that the operation would be substantially the same as above described.

What is claimed is—

A fluid-motor adapted to be operated by impact, comprising a pivotally-mounted open-ended casing having a wheel journaled between the sides thereof, a pair of uprights at each end of the casing, a door slidably disposed between each pair of uprights, a cross-brace joining the tops of each of said pairs, a pair of vanes attached to one end of the casing to direct its opposite end toward the wind, pulleys mounted upon the cross-brace at the forward end of the casing, a windlass mounted upon one side of the casing, a rope disposed upon the pulleys and having one of its ends attached to the windlass and the other to the forward door, said door thus being adapted for careful adjustment, a lever pivoted to the top of one of the rearward uprights, a rod connecting one end of the lever with the remaining door, a rod having an eye at its lower end attached to the free end of the lever and a series of pins mounted upon the side of the casing for engagement separately with the eye of the rod to adjust the door.

In testimony whereof I affix my signature in presence of two witnesses.

JOHN MARTEN CROW.

Witnesses:
FRANK A. CLARK,
PERRY R. COPELAND.